Aug. 4, 1970     E. R. CRIPPA     3,522,497

DIGITALLY-CONTROLLED HIGH SPEED CAPACITOR TUNING APPARATUS

Filed Oct. 17, 1968

INVENTOR.
EUGENE R. CRIPPA
BY
ATTORNEYS

United States Patent Office 3,522,497
Patented Aug. 4, 1970

3,522,497
DIGITALLY-CONTROLLED HIGH SPEED CAPACITOR TUNING APPARATUS
Eugene R. Crippa, El Cajon, Calif., assignor to the United States of America as represented by the Secretary of the Navy
Filed Oct. 17, 1968, Ser. No. 768,339
Int. Cl. H01g 5/04
U.S. Cl. 317—250
4 Claims

ABSTRACT OF THE DISCLOSURE

Apparatus for selectively adjusting the capacitance of a hermetically-sealed variable capacitance device is disclosed. A digitally-controlled drive mechanism is operatively connected to a set of capacitor plates moveable with respect to a fixed set. The drive mechanism comprises an electromagnetic flux responsive element positioned within a hermetically sealed enclosure to impart movement to the movable plates in response to electromagnetic flux from a source positioned outside the enclosure. The entire capacitor is disposed in substantially a vacuum to enable high power operation.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to apparatus providing a reliable tuning method and mechanism for adjusting variable capacitance devices located within hermetically-sealed enclosures. Existing variable capacitors have several undesirable characteristics which make them unadaptable to the new high speed tuning requirements of Navy communication transmitters. These variable capacitors require a bellows to which torque is applied to rotate the rotor plates of the capacitors. Bellows have very severe limitations as to life and torquing power requirements having limited cycling life, and are prone to failure after being cycled a limited number of times.

Furthermore, existing variable capacitors have very undesirable torquing characteristics, that is, the torque requirements can be excessive and can vary considerably over the extension path from compression to extension. Thus, as the bellows is compressed or extended more and more from a central position, greater and greater torque is required. Also, when the bellows is compressed or extended it tends to return to its neutral position; therefore, the bellows may require in some cases additional friction or locking to hold it in the desired position.

Furthermore, the mechanisms on the existing variable capacitors are not readily adaptable to digital techniques; therefore, rather elaborate and complicated circuitry and mechanisms are required to provide conversion to digital operation and control.

SUMMARY OF THE INVENTION

The present invention provides apparatus for automatically tuning variable capacitance devices such as those used in high power communication systems. The apparatus includes a digitally-controlled drive mechanism operatively connected to a set of capacitor plates moveable with respect to a fixed set. The entire capacitance device is disposed in a vacuum to enable high power operation. A torque is supplied outside the vacuum by digitally controlled electromagnetic means to actuate the drive mechanism.

STATEMENTS OF THE OBJECTS OF THE INVENTION

An object of the present invention is to provide reliable automatic tuning apparatus for variable capacitance devices contained within a hermetically-sealed enclosure.

Another object of the present invention is to provide automatic tuning apparatus including a digitally-controlled drive mechanism.

Another object is to provide automatic tuning apparatus having a substantially longer life than the bellows-type arrangements now in use.

A further object of the present invention is to provide automatic tuning apparatus in which torquing requirements are uniform, thus reducing the drive torque requirements.

Another object is to provide automatic tuning apparatus directly applicable to digital systems and capable of performing with digital type power and control sources.

Another object of the present invention is to provide automatic tuning apparatus having inherently high reliability compared to the bellows-type tuning capacitors.

Other objects and features of this invention will become apparent through the following detailed description of the invention when considered in conjunction with the accompanying drawings.

BRIEF DESCRIPTION OF THE DRAWINGS

In the drawings.

In the drawings like reference numerals refer to identical parts.

DESCRIPTION OF THE PREFERRED EMBODIMENTS

Figure 1:
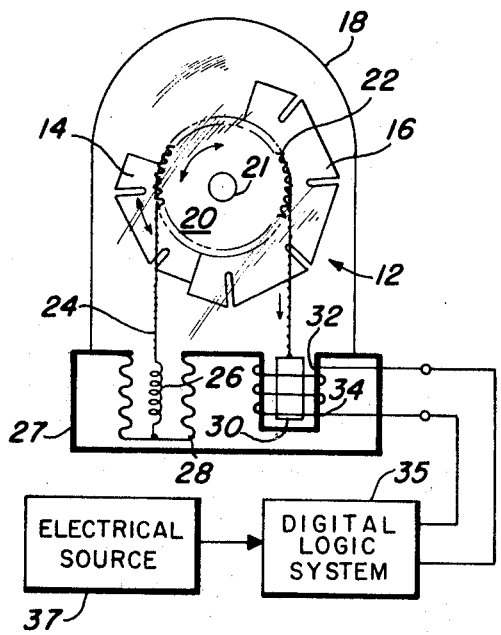
FIG. 1 is a view of the preferred embodiment of the present invention.

FIG. 1 illustrates a variable capacitance device 12 in which capacitor element 14 is moveable with respect to fixed capacitor element 16. The entire assembly is mounted and supported within a hermetically-sealed enclosure 18 which could be a vacuum. Also supported and located within enclosure 18 is a wheel 20 which is coupled to shaft 21 and which has a serrated peripheral face 22. A serrated strap 24 is looped over the wheel 20 and has one end anchored by a calibrated spring 26. Spring 26 is adjustable from the outside of the enclosure by small spring bellows 28. The outer end of the strap terminates in solenoid plunger 30 which is arranged and disposed in a non-magnetic cylindrical cavity 32 within enclosure 18. On the outside of the cylindrical cavity 32, is supported solenoid coil 34 which is energized by pulses from digital logic system 35. Digital logic system 35, which is of conventional design and whose operation is well known, converts the input signals from electrical source 37 into pulses having desired characteristics. Digital control and operation of the tuning device is an important consideration if automation and high-speed operation are desired such as is the case in advance shipboard and shore communication systems.

Each time a pulse is applied to the solenoid coil 34 through digital logic system 35, the magnetic field created by the pulse causes the plunger 30 to be pulled into the coil 34. This action pulls the strap 24 down on the wheel 20. The strap moves in the direction of the pull indicated by the arrow in FIG. 1. Simultaneously, with the movement of the strap 24 and the wheel 20, shaft 21 rotates, thereby causing movement of capacitive element 14 with respect to capacitive element 16.

Wheel 20 moves a fixed increment for each pulse applied to the solenoid 34. The number of pulses applied can be counted using conventional means to indicate the number of revolutions of the shaft and wheel and thus indicate the position of the drive mechanism. Termination of the pulse allows the spring 26 to pull the strap back to its normal static position. An identical strap, not shown, arranged and disposed in the reverse manner provides a counterclockwise rotation of the wheel.

Figure 2:
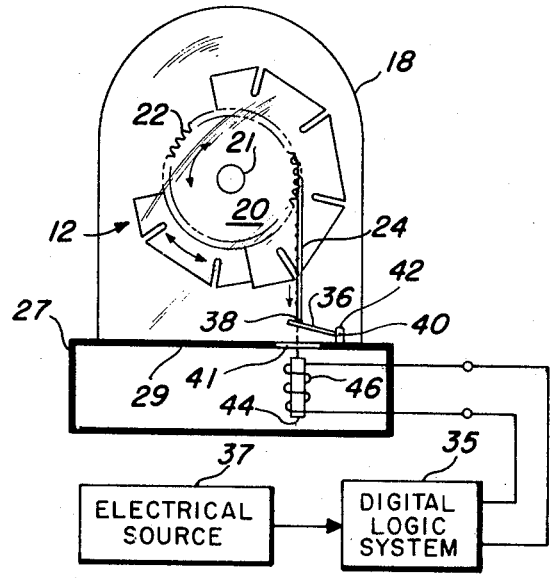
FIG. 2 is a view of an alternate drive mechanism for the apparatus of FIG. 1.

FIG. 2 is a cut-away view of an alternate drive mechanism for the apparatus that is shown in FIG. 1. The plunger 30 in FIG. 1 is shown replaced by a hinged flapper-type arm 36. The arm 36 is attached to belt 24 at pivot point 38 and is attached to supporting post 42 at pivot point 40. Upon electrical actuation of the combination of solenoid 46 and polepiece 44 the magnetic field thus created pulls soft-iron arm 36 in the direction of the arrow indicated in FIG. 2. The downward movement of arm 36 causes incremental rotation of wheel 20 and shaft 21 thereby varying the capacitance of device 12.

A non-magnetic diaphragm 41 is positioned between arm 36 and solenoid 46 and polepiece 44 to prevent shielding of the magnetic field by wall 29 of base 27 which supports enclosure 18.

An alternate approach to the serrations of the wheel 20 and strap 24 of FIGS. 1 and 2 is to use a smooth wheel and bond on the contracting surface of the strap a non-gassing abrasive to provide a friction surface which drives this wheel in response to the magnetic field.

Figure 3:
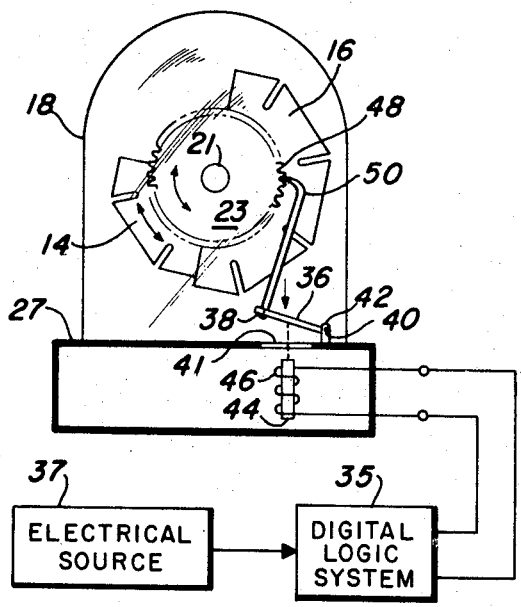
FIG. 3 is likewise a view of an alternate drive mechanism for the apparatus of FIG. 1.

FIG. 3 depicts an alternate drive mechanism similar to the drive mechanisms shown in FIGS. 1 and 2 except that a flapper arrangement is used to drive the wheel directly. Wheel 20 and strap 24 of FIGS. 1 and 2 are replaced by wheel 23 which has teeth 48 on the peripheral face. As arm 36 is attracted towards solenoid coil 46 and polepiece 44 in the manner previously described, flapper arm 50 simultaneously engages the teeth 48 on wheel 23 and incrementally rotates the wheel. A second drive mechanism, not shown, provides rotation in the opposite direction.

Figure 4:
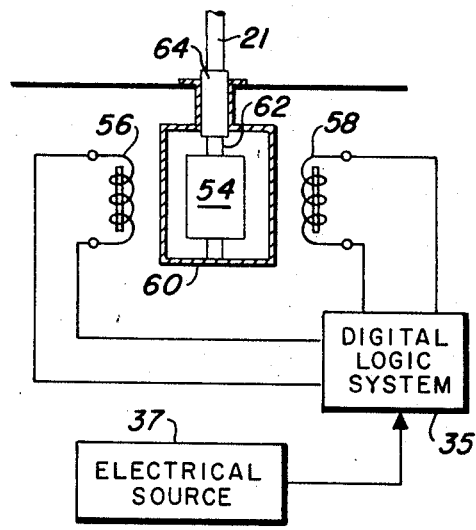
FIG. 4 is a view of an alternate drive mechanism for the apparatus of FIG. 1 wherein the drive mechanism constitutes a rotating motor.

FIG. 4 shows another drive mechanism which employs a rotating motor, of the induction, stepper or synchronous type, to apply a torque directly to shaft 21 which connects to the moveable capacitor element. The rotor portion of the motor 54 is supported and disposed inside the vacuum enclosure. The stator portion, 56 and 58, is supported and disposed outside the vacuum enclosure. A very thin stainless steel cylinder 60 is placed in the motor air gap to complete the vacuum structure and seal the rotating part inside the vacuum enclosure. The windings 56 and 58 of the motor are external to the vacuum chamber and when power is applied to them the magnetic field thus created passes through non-magnetic cylinder 60 and causes the rotor 54 of the motor to rotate in a normal manner. As rotor 54 rotates, rotational movement is imparted to shaft 21 through shaft 62 and gear box 64. This approach can provide tuning mechanisms with extremely high torquing forces and long life.

Rotor 54 of the motor is covered with a non-magnetic coating to prevent the out-gassing of some of the construction materials if it is not possible to construct it completely of gas-free materials and components.

Obviously many modifications and variations of the present invention are possible in the light of the above teachings. It is, therefore, to be understood that within the scope of the appended claims the invention may be practiced otherwise than as specifically described.

In the claims:
1. Apparatus for selectively adjusting the capacitance of a variable capacitance device comprising:
 a first capacitive element;
 a second capacitive element supported and adapted for movement relative to said first capacitive element;
 a hermetically-sealed housing fully enclosing said first and second capacitive elements;
 an electromagnetic flux responsive drive mechanism supported within said housing and adapted to impart movement to said second capacitive element;
 said drive mechanism comprising a wheel having a peripheral face in movable contact with a strap;
 said strap being terminated at one end in a calibrated resilient means and being terminated at the other end thereof in a solenoid plunger supported in a nonmagnetic cylindrical cavity within said housing;
 an electromagnetic flux source positioned outside said housing and adapted to magnetically link said flux responsive drive mechanism upon energization from an electrical source;
 said electromagnetic flux source comprising a solenoid coil; and,
 digital control means connected between said electrical source and said electromagnetic flux source for selectively actuating said electromagnetic flux source.

2. The apparatus of claim 1 wherein said wheel and said strap both have serrated faces for driving the wheel.

3. The apparatus of claim 1 wherein said wheel face is smooth and said strap has bonded on the contacting surface thereof a non-gassing abrasive to provide a friction surface for driving the wheel.

4. Apparatus for selectively tuning a variable capacitance device comprising:
 a first capacitive element;
 a second capacitive element supported and adapted for movement relative to said first capacitive element;
 a hermetically sealed housing fully enclosing said first and second capacitive elements;
 an electromagnetic flux responsive drive mechanism supported within said housing and adapted to impart movement to said second capacitive element;
 said flux responsive drive mechanism comprising a wheel having a serrated peripheral face and a magnetically actuated flapper arm, said arm engaging said serrations for imparting movement to said wheel; and,
 digital control means connected between said electrical source and said electromagnetic flux source for converting input signals from said electrical source into pulses having selectively predetermined characteristics for selectively actuating said electromagnetic flux source.

References Cited

UNITED STATES PATENTS

| 1,446,267 | 2/1923 | Newcomb. |
| 1,699,158 | 1/1929 | Pfanstiehl _____ 74—10.7 X |
| 2,522,463 | 8/1950 | Potts. |

FOREIGN PATENTS

| 239,524 | 3/1926 | Great Britain. |

ELLIOT A. GOLDBERG, Primary Examiner

U.S. Cl. X.R.

74—10.7, 142; 317—245, 255